United States Patent [19]

Benzing

[11] 4,430,681
[45] Feb. 7, 1984

[54] OVERLOAD PROTECTION ARRANGEMENT FOR AN ELECTRIC MOTOR, ESPECIALLY OF A HAND-HELD POWER TOOL

[75] Inventor: Rolf Benzing, Neuffen, Fed. Rep. of Germany

[73] Assignee: Metabowerke GmbH & Co., Nuertingen, Fed. Rep. of Germany

[21] Appl. No.: 266,355

[22] Filed: May 22, 1981

[30] Foreign Application Priority Data

Jun. 10, 1980 [DE] Fed. Rep. of Germany ....... 3021689

[51] Int. Cl.³ ............................................ H02H 7/085
[52] U.S. Cl. .................................. 361/27; 310/68 C; 318/783
[58] Field of Search ................... 361/27, 106; 318/783, 318/334, 345 D, 345 H, 471, 473; 310/68 C

[56] References Cited

FOREIGN PATENT DOCUMENTS 2130636 2/1972 Fed. Rep. of Germany ...... 361/106
2243109 8/1973 Fed. Rep. of Germany ...... 361/106
2238022 2/1974 Fed. Rep. of Germany ...... 361/106

Primary Examiner—Harry E. Moose, Jr.
Attorney, Agent, or Firm—Michael J. Striker

[57] ABSTRACT

An overload protection arrangement for an electric motor, especially of a hand-held power tool, includes an electronic speed of rotation control arrangement which is, in turn, controlled by an overload circuitry which includes a positive temperature coefficient resistor situated in the winding of the electric motor and incorporated in a voltage divider. The output of the PTC-resistor is amplified by an amplifier and, when the temperature of the winding increases above an acceptable level, the maximum current which can be drawn by the electric motor is reduced to a level at which the winding cannot burn out even if the rotor of the electric motor is blocked. If the rotor can rotate freely, the speed of rotation thereof even at the reduced power input will be sufficient to assure rapid cooling of the device powered by the electric motor. A time-delay member consisting of a capacitor and a resistor is arranged in parallel with the operational amplifier.

6 Claims, 1 Drawing Figure

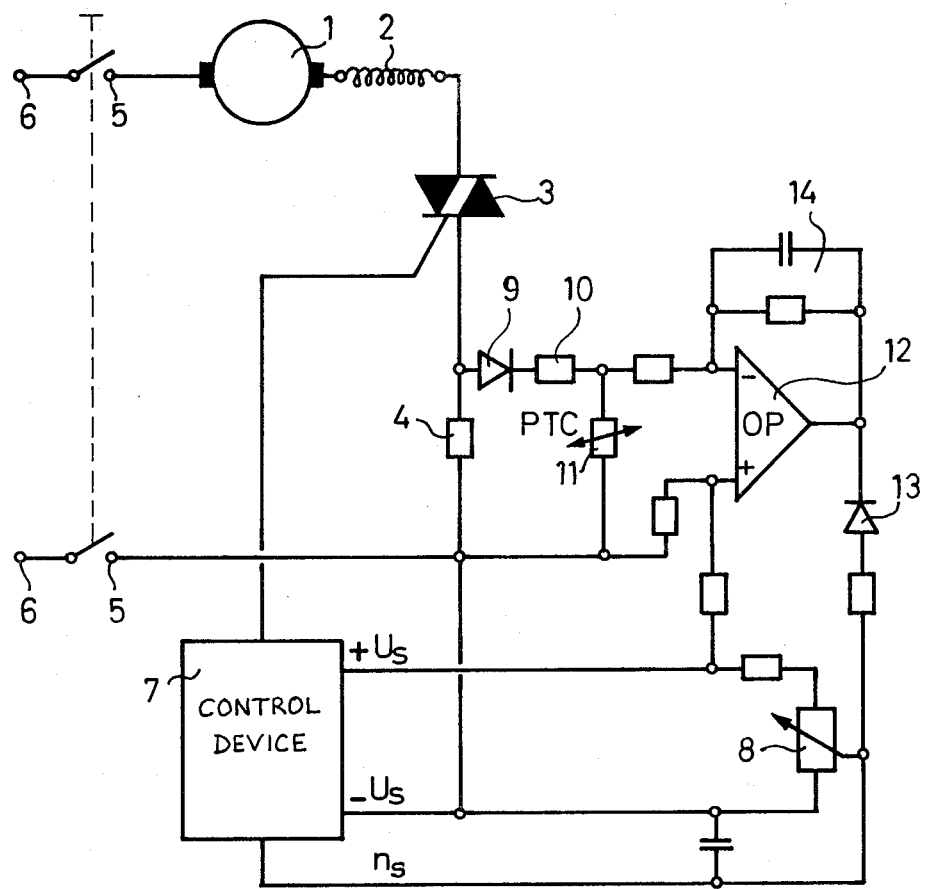

OVERLOAD PROTECTION ARRANGEMENT FOR AN ELECTRIC MOTOR, ESPECIALLY OF A HAND-HELD POWER TOOL

BACKGROUND OF THE INVENTION

The present invention relates to an overload protection arrangement for an electric motor in general, and more particularly for use in hand-held power tools.

There are already known various overload protection arrangements for electric motors, in which a temperature sensor is provided which supervises or detects the temperature of the winding of the electric motor which is in danger of being overloaded under certain operating conditions of the electric motor. When this sensor detects the rise of the temperature of the winding above an acceptable level, it issues a signal which is used for reducing the supply of power to the electric motor.

So, for instance, it is known to use a positive temperature coefficient resistor as the temperature sensor, this so-called PTC-resistor being arranged in the affected winding of the electric motor, and to use the signal generated thereby when the acceptable temperature level has been exceeded for shutting off the tool driven by the overloaded electric motor by means of suitable devices, such as a relay or an electronic control device.

There are further known excessive current protection switches by means of which the voltage supplied to the electric motor of the power tool is reduced to a constant value when the danger of overheating of the winding of the electric motor exists, in order to render it possible for the electric motor to still run so as to assure the cooling of the power tool during the continuing idle running of the electric motor. However, if the electric motor or the tool is still being loaded after the voltage has been thus reduced, there exists the danger of blocking of the rotor of the electric motor, as a result of which the opposing voltage is reduced and the electric current increases again, so that the winding in question can still burn out. An arrangement of this type is disclosed, for instance, in the European Patent Application No. 7617.

It is further known to shut off the electrically powered tool by means of an overload or excessive current protection switch in the event of danger of winding overheating. However, as a result of the complete shut-off of the power tool, the stream of cooling air is interrupted, so that the cooling continues only at a very slow pace, so that the time span during which the power tool is idle prior to the moment when the operation thereof can be safely recommenced is relatively long. This, of course, is also very disadvantageous, even though not as much as the possibility of burning out of the affected winding which exists in the arrangement discussed above.

SUMMARY OF THE INVENTION

Accordingly, it is a general object of the present invention to avoid the disadvantages of the prior art.

More particularly, it is an object of the invention to provide an overload protection arrangement for an electric motor, which is not possessed of the disadvantages of the conventional arrangements of this type.

A further object of the present invention is to so construct the arrangement of the type here under consideration as to achieve a reduction in the power supply to the electric motor in the event of overheating of the respective winding to a level at which the electric motor runs at a sufficent speed for achieving effective cooling, at which the burning out of the affected winding is avoided even if the rotor of the electric motor is blocked in position, and at which an immediate recommencement of rotation is achieved upon discontinuance of the blockage of the rotor for cooling purposes.

It is a concomitant object of the present invention to so design the overload protection arrangement as to be simple in construction, inexpensive to manufacture, easy to use, and reliable nevertheless.

In pursuance of these objects and others which will become apparent hereafter, one feature of the present invention resides in an overload protection arrangement for an electric motor, especially of a hand-held power tool, which comprises means for detecting the temperature of a winding of the electric motor which is in danger of overload under certain operating conditions of the electric motor; and means for reducing the magnitude of the maximum current that can be drawn by the electric motor in response to the detection of an excessive temperature by the detecting means. Advantageously, the maximum current magnitude is reduced to a level corresponding to the magnitude of continuous current which the winding can withstand without being damaged when the rotor of the electric motor is blocked in position.

For instance, a PTC-resistor can be arranged in or at the winding and, as a result of the resistance change thereof due to excessive heating of the winding, the PTC-resistor may activate an electronic current limiting device or the like. The selected magnitude of the reduced current is so low that no burning out of the affected winding can occur even if the rotor of the electric motor is blocked in position. However, on the other hand, this reduced value of the electric current is still high enough to assure the reasonably high speed of rotation of the rotor of the electric motor when idling, i.e. not subjected to any external load, which is needed for a rapid cooling, so that the device can be soon operated at the full load again. The current limitation or reduction is discontinued immediately after the temperature of the affected winding has decreased to below the still acceptable level.

Current control devices and current limiting devices are already known, even in combination with speed of rotation control arrangements, and they are being currently used in electrical drives, so that the many structural possibilities thereof need not be discussed here in any great detail.

The novel features which are considered as characteristic of the invention are set forth in particular in the appended claims. The improvement overload protection arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The sole FIGURE of the drawing is a diagrammatic representation of the overload protection arrangement of the present invention.

DETAILED DESCRIPTION OF THE PREFERRED EMBODIMENT

Referring now to the drawing in detail, it may be seen therein that the reference numeral 1 has been used to identify an electric motor of a hand-held power tool, for instance, which power tool is of a conventional construction and thus has been omitted from the drawing in order not to unduly encumber the same.

The electromotor 1 is equipped with at least one winding 2 which is connected in a circuit incorporating at triac 3 and an auxiliary resistor 4, as well as two switches 5 and 6 by means of which the aforementioned circuit can be connected to the electric network and dissociated therefrom. The triac 3 can be controlled by an electronic speed of rotation control device 7. A potentiometer 8 and associated connecting leads supply an electric value to the control device 7, this value being representative of the desired value of the speed of rotation, indicated as $n_s$.

A diode 9, a constant resistance 10 and a PTC-resistor 11 which is arranged in the winding 2 are arranged in parallel to the auxiliary resistance 4. At normal temperature, the positive temperature coefficient resistor 11 has a relatively low electrical resistivity. This resistivity, however, increases drastically upon reaching the critical or acceptable temperature in the winding 2, and, as a result of this, the desired value electrical signal is reduced by means of an operational amplifier 12 during the increase in the resistivity, to such an extent that only a maximum acceptable current can still flow through the auxiliary resistor 4. The actual current limitation is achieved by means of controlling the triac 3 by the electronic speed of rotation control device 7.

As can also be seen in the accompanying FIGURE, the circuitry further includes additional resistors which serve, in a conventional manner, for adjusting the parameters of the circuitry. Since such resistors are conventional, they have not been identified by any reference numerals. The circuitry further includes a diode 13 which serves for de-coupling. In order not to obtain any abrupt changes in the current, a time-delay member consisting of a capacitor and a resistor and indicated at 14 is arranged in parallel with the operational amplifier 12.

What is quite important in the arrangement of the present invention is that the current limitation occurs only when the temperature of the winding 2 exceeds a safe limit and that the value for the current limitation is so selected and adjusted that, regardless of any further loading of the electric motor 1, or lack of loading, the winding 2 cannot burn out and yet, when the tool is not subjected to any load, there is achieved a rapid cooling due to the action of the idly running motor 1.

It will be understood that each of the elements described above, or two or more together, may also find a useful application in other types of devices differing from the type described above.

While the invention has been illustrated and described as embodied in an overload protection for electric motors of hand-held power tools, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letter Patent is set forth in the appended claims:

1. An overload protection arrangement for an electric motor equipped with an electronic speed of rotation control device, especially of a hand-held power tool, comprising means for detecting the temperature of a winding of the electric motor which is in danger of overload under certain operating conditions, including a positive temperature coefficient resistor; and means for reducing the magnitude of the maximum current that can be drawn by the electric motor in response to the detection of an excessive temperature by said detecting means, including a voltage divider incorporating said resistor as one of its constituent parts, and an operational amplifier having one input connected from said resistor and an output connected to the electronic speed of rotation control device and operative for controlling the latter so that the desired value of the speed of rotation which is supplied to the electronic speed of rotation control device is reduced when the acceptable temperature of the respective winding is exceeded.

2. The overload protection arrangement as defined in claim 1, and further comprising means for delaying the change in the desired value of the speed of rotation, including a time-delay member coupled in parallel with said operational amplifier.

3. An overload protection arrangement for an electric motor equipped with an electronic speed of rotation control device, especially of a hand-held power tool, comprising means for detecting the temperature of the winding of the electric motor which is in danger of overload under certain operating conditions and for issuing an electric signal representative of the detected temperature; means for reducing the magnitude of the maximum current that can be drawn by the electric motor in response to the detection of an excessive temperature by said detecting means, including means for automatically controlling the speed of rotation control device in dependence on said electric signal and independently from the original setting of said control device so as to reduce the speed of rotation of the electric motor upon increase of the detected temperature; said control device having a phase-control semiconductive switch means arranged in series with said winding, said reducing means including a shunting resistor interposed in the path of current through the switch means, and a variable resistance branch bypassing said shunting resistor; and wherein said detecting means includes a positive temperature coefficient resistor connected in said bypassing branch and operative for controlling the variable resistance of said bypassing branch.

4. The overload protection arrangement as defined in claim 3, wherein said shunting resistor has such a resistance as to reduce the current flowing through the respective winding to the maximum permissible value when the electric motor is blocked in position.

5. The overload protection arrangement as defined in claim 4, wherein said reducing means further includes an operational amplifier having two inputs and an output; wherein said shunting resistor and said positive temperature coefficient resistor are connected in parallel to one another between said inputs; and wherein said output is connected to said speed of rotation control device.

6. The overload protection arrangement as defined in claim 5, and further comprising means for delaying the operation of the reducing means, including a time-delay device arranged in parallel to said operational amplifier.

* * * * *